US009253773B2

(12) United States Patent
Khoo et al.

(10) Patent No.: US 9,253,773 B2
(45) Date of Patent: Feb. 2, 2016

(54) METHOD AND APPARATUS FOR WIRELESSLY TRANSACTING SIMULTANEOUS VOICE AND DATA ON ADJACENT TIMESLOTS

(71) Applicant: MOTOROLA SOLUTIONS, INC, Schaumburg, IL (US)

(72) Inventors: Hun Weng Khoo, Gelugor (MY); Yueh Ching Chung, Georgetown (MY); David G Wiatrowski, Woodstock, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 216 days.

(21) Appl. No.: 14/013,444

(22) Filed: Aug. 29, 2013

(65) Prior Publication Data

US 2015/0063326 A1    Mar. 5, 2015

(51) Int. Cl.
| | |
|---|---|
| *H04J 1/00* | (2006.01) |
| *H04W 72/04* | (2009.01) |
| *H04W 4/08* | (2009.01) |
| *H04B 7/26* | (2006.01) |
| *H04J 3/22* | (2006.01) |
| *H04L 12/16* | (2006.01) |
| *H04L 12/66* | (2006.01) |

(52) U.S. Cl.
CPC ......... *H04W 72/0446* (2013.01); *H04B 7/2656* (2013.01); *H04W 4/08* (2013.01); *H04J 3/22* (2013.01); *H04L 12/16* (2013.01); *H04L 12/66* (2013.01)

(58) Field of Classification Search
CPC ............ H04W 76/007; H04W 76/023; H04W 76/002; H04W 76/064; H04J 3/22; H04L 12/16; H04L 12/66

USPC .................. 370/337, 493, 490, 354
See application file for complete search history.

(56) References Cited

U.S. PATENT DOCUMENTS

| | | | | |
|---|---|---|---|---|
| 4,914,650 | A | * | 4/1990 | Sriram ......................... 370/235 |
| 5,521,925 | A | * | 5/1996 | Merakos et al. .............. 370/337 |

(Continued)

FOREIGN PATENT DOCUMENTS

| | | |
|---|---|---|
| EP | 0948147 A1 | 10/1999 |
| EP | 1332569 B1 | 7/2011 |

(Continued)

OTHER PUBLICATIONS

International Search report dated Oct. 10, 2014, counterpart of PCT/US2014/049742.

*Primary Examiner* — Ricky Ngo
*Assistant Examiner* — Dewanda Samuel
(74) *Attorney, Agent, or Firm* — Daniel R. Bestor

(57) ABSTRACT

A wireless method, apparatus, and system provide simultaneous transacting of voice and data on adjacent timeslots through a combination of channel access rules and sacrificing small audio portions when required. This includes wirelessly operating on at least two timeslots which are adjacent to one another, operating voice on a first timeslot of the at least two timeslots and monitoring a second timeslot of the at least two timeslots for data, and, responsive to a data transmission request and receiving voice on the first timeslot, discarding a portion of the voice in the first timeslot to provide a larger guard time for programming between the first timeslot and the second timeslot and transmitting data in the second timeslot based on the data transmission request.

20 Claims, 6 Drawing Sheets

(56) References Cited

U.S. PATENT DOCUMENTS

| | | | |
|---|---|---|---|
| 5,721,762 A * | 2/1998 | Sood | 455/466 |
| 5,812,952 A | 9/1998 | Bar-On et al. | |
| 6,044,266 A * | 3/2000 | Kato | 455/422.1 |
| 6,112,084 A | 8/2000 | Sicher et al. | |
| 6,611,536 B1 * | 8/2003 | Ahmed | H04J 3/175 |
| | | | 370/336 |
| 6,847,821 B1 | 1/2005 | Lewis et al. | |
| 7,483,418 B2 | 1/2009 | Maurer | |
| 7,545,745 B1 * | 6/2009 | Cherchali | H04L 41/5003 |
| | | | 370/232 |
| 2002/0001317 A1 | 1/2002 | Herring | |
| 2008/0159199 A1 * | 7/2008 | Chowdhary et al. | 370/315 |
| 2008/0167062 A1 * | 7/2008 | Gilbert et al. | 455/516 |
| 2009/0219916 A1 * | 9/2009 | Bohn | 370/347 |
| 2009/0303923 A1 * | 12/2009 | Wiatrowski et al. | 370/328 |
| 2011/0028084 A1 * | 2/2011 | Wiatrowski et al. | 455/7 |

FOREIGN PATENT DOCUMENTS

| | | |
|---|---|---|
| EP | 2393260 A1 | 12/2011 |
| GB | 2497946 A | 7/2013 |
| WO | 0074274 A1 | 12/2000 |

* cited by examiner

METHOD AND APPARATUS FOR WIRELESSLY TRANSACTING SIMULTANEOUS VOICE AND DATA ON ADJACENT TIMESLOTS

BACKGROUND OF THE INVENTION

The present disclosure relates to wireless communication networks. For time division multiple access (TDMA), various communication protocols exist including, without limitation, Project 25 (P25), Terrestrial Trunked Radio (TETRA), Digital Mobile Radio (DMR), Public Safety Long Term Evolution (LTE), and the like. PCR (Professional and Commercial Radio) radios have difficulty receiving and transmitting voice and data on adjacent TDMA slots. For example, DMR is a TDMA system with only two time slots operating on a 12.5 kHz channel. In conventional radios, based on DMR, it is not possible to receive data while the radio is operating a voice call. These conventional radios cannot use one slot for voice and another slot for transmitting short location data (e.g., Global Positioning System (GPS)). One reason behind this limitation is that conventional radios cannot switch frequencies fast enough. Conventional systems are not able to complete a radio frequency (RF) state change (RX to TX and vice versa) in the short window of the guard time between adjacent slots, (e.g., 2.5 msec).

Accordingly, there is a need for a method and apparatus for wirelessly transacting simultaneous voice and data on adjacent timeslots in view of the aforementioned limitations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
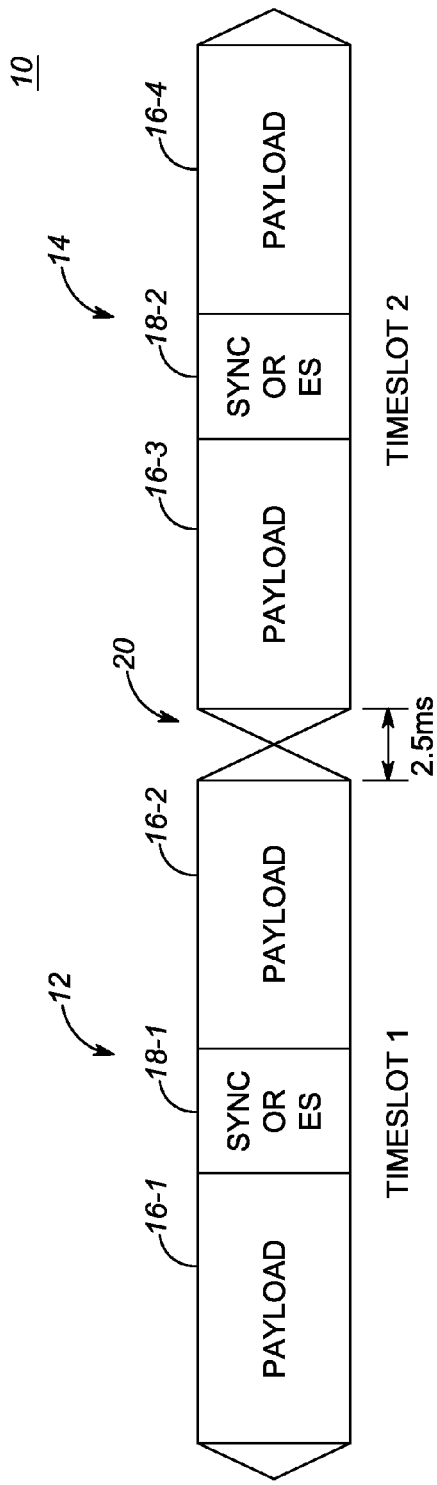
FIG. 1 is a block diagram of a two timeslot DMR data stream in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a wireless method for operating on at least two timeslots that are adjacent to one another includes operating voice on a first timeslot of the at least two adjacent timeslots and monitoring a second timeslot of the at least two adjacent timeslots for data; and responsive to detecting a data transmission request: receiving un-discarded voice on the first timeslot; discarding a portion of the voice in the first timeslot to provide a larger guard time for programming between the first timeslot and the second timeslot; and transmitting data in the second timeslot based on the data transmission request.

In another exemplary embodiment, an apparatus includes a radio configured to transmit and receive on at least two adjacent timeslots; a processor communicatively coupled to the radio; and memory storing instructions that, when executed, cause the processor to perform steps of: receive, via the radio, voice on a first timeslot of the at least two adjacent timeslots and monitor a second timeslot of the at least two adjacent timeslots for data; and responsive to detecting a data transmission request: receive, via the radio, un-discarded voice on the first timeslot; discard a portion of the voice in the first timeslot to provide a larger guard time for programming the radio between the first timeslot and the second timeslot; and transmit, via the radio, data in the second timeslot based on the data transmission request.

In yet another exemplary embodiment, a system includes a plurality of radios configured to wirelessly communicate therebetween using two adjacent timeslots on a time division multiple access (TDMA) channel; wherein the plurality of radios utilize a first timeslot of the two adjacent timeslots for voice communication therebetween; wherein the plurality of radios utilize a second timeslot of the two adjacent timeslots for data communications; and wherein the plurality of radios utilize a set of channel access rules to enable voice on the first timeslot and data on the second timeslot, the set of channel access rules provide discarding of a portion of audio in the first timeslot to enable a larger guard time for programming each radio between the first timeslot and the second timeslot and queuing of data for the second timeslot as appropriate.

In various exemplary embodiments, a wireless method, apparatus, and system describe simultaneously receiving and transmitting voice and data through using adjacent time slots. The wireless method, apparatus, and system contemplates operation in a TDMA system such as a two-slot DMR radio operating in a repeater mode. For example, the radio receives voice in the home slot and monitors activity on the adjacent slot for incoming data. Whenever the radio needs to transmit an L2 ACK (Link layer Acknowledgment), CSBK ACK or CSBK (Control Signaling Block) in the adjacent slot, it drops a portion of audio (40 msec.) thereby creating an audio hole and enabling a larger guard time between the adjacent slots. Further, a new channel access method is proposed wherein the radio transmitting data monitors the source ID from the link control on the adjacent slot, and if the radio transmitting voice is one of the target radios of the data message, the data is queued until the voice transmission ends. Still further, to prevent a radio from sending group data messages to groups a radio currently transmitting voice is interested in, all the radios on an RF channel are programmed with the same set of talkgroup list. The data transmitting radio monitors the talkgroup list and determines whether the target group is included in the identified talkgroup list. Consequently, if the talk group is included, the data is queued until the transmission ends; else it proceeds with the data transmission.

FIG. 1 is a block diagram of a two timeslot DMR data stream 10 in accordance with some embodiments. Throughout the foregoing descriptions of the wireless method, apparatus, and system reference is made to the two timeslot DMR data stream 10 for illustration purposes. Those of ordinary skill in the art will recognize the wireless method, apparatus, and system equally applies to other TDMA systems where adjacent timeslots (e.g., immediately adjacent timeslots with only guard time or similar time period therebetween) are used for data and voice. The DMR data stream 10 includes two timeslots 12, 14. The first timeslot 12 includes a first payload portion 16-1 and a second payload portion 16-2, and the second timeslot 14 includes a third payload portion 16-3 and a fourth payload portion 16-4. Additionally, each of the timeslots 12, 14 includes synchronization (SYNC) or embedding signaling (ES) 18-1, 18-2. There is a guard time 20 of 2.5 msec between the timeslots 12, 14. As described herein, with conventional RF technology, a radio operating the DMR data stream 10 is not able to complete an RF state change (RX to TX and vice versa) in the short window of the guard time 20, i.e. 2.5 msec.

Variously, the wireless method, apparatus, and system propose a method to operate voice while still being able to operate data simultaneously in repeater mode by using the adjacent slot. With the wireless method, apparatus, and system, radios are enabled to receive data (confirmed) while unmuted to a voice call (in repeater mode). Also, radios can use one slot for voice and another slot for single CSBK GPS data or the like. In DMR, this allows the same 12.5 KHz channel to implement data and voice when migrating from analog to DMR F2 mode. As such, the wireless method, apparatus, and system enable sending Confirmed CSBKs (with returned CSBK ACK) to a radio that is receiving a voice call. This can be used for Radio Check, Call Alert, Emergency Alarm, etc. The wireless method, apparatus, and system also enables sending Confirmed Data (with returned L2 ACK, NACK, SARQ) to a radio that is receiving a voice call such as for text messages, telemetry, etc. The wireless method, apparatus, and system further enables transmitting Data CSBKs from a radio that is receiving a voice call such as GPS CSBKs, ARS CSBKs, etc. as well as receiving voice when a radio is receiving a large data file (fragmented at layer 2).

Figure 2:
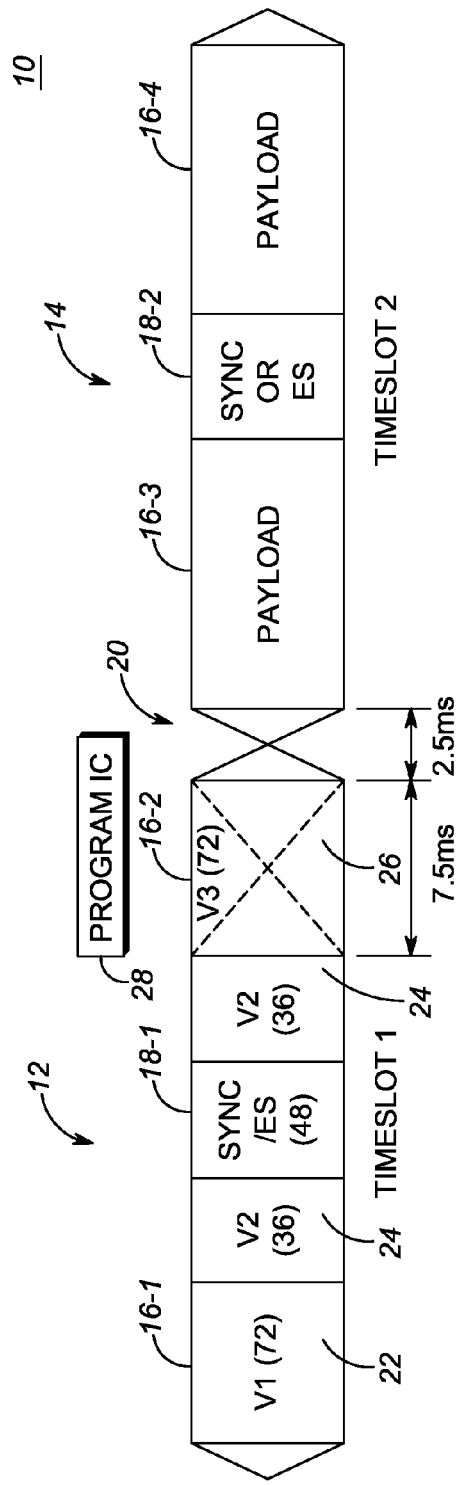
FIG. 2 is a block diagram of the two timeslot DMR data stream of FIG. 1 utilizing the wireless method, apparatus, and system in accordance with some embodiments.

FIG. 2 is a block diagram of a two timeslot DMR data stream 10 utilizing the wireless method, apparatus, and system in accordance with some embodiments. In FIG. 2, the DMR data stream 10 is illustrated with additional details shown in the first timeslot 12. Specifically, the first timeslot 12 includes three voice segments (V1, V2, V3) 22, 24, 26 of 72 bits or 20 msec of audio content for each voice segment. The voice segment V1 22 is located first, the voice segment V2 24 is located in the middle with the embedding signaling 18-1 contained between the voice segment V2 24, and the voice segment V3 26 is located last. FIG. 2 illustrates the DMR data stream 10 as an exemplary description of the wireless method, apparatus, and system of simultaneously receiving and transmitting voice and data by using adjacent time slots. One timeslot can operate for voice while another can operate for data.

In the example of FIG. 2, the timeslot 12 is for voice while the timeslot 14 is for data. Here, an associated radio operates voice in the timeslot 12, which can be referred to as the home slot, while monitoring activity on the adjacent timeslot 14 for incoming data. When the radio needs to transmit data, e.g. a L2 Response (e.g., ACK, NACK), it sacrifices a 20 msec audio segment, i.e. the voice segment V3 26, next to the guard time 20 to create some time for integrated circuit (IC) programming 28. Specifically, the voice segment V3 26 is dropped, providing an additional 7.5 msec in addition to the guard time 20 of 2.5 msec for the IC programming 28. Variously, the wireless method, apparatus, and system uses one timeslot 12, 14 as the home slot for voice and the other for data. In this manner, the wireless method, apparatus, and system enables transmitting or receiving voice in the home slot while transmitting or receiving data in the other adjacent slot as is described herein.

Figure 3:
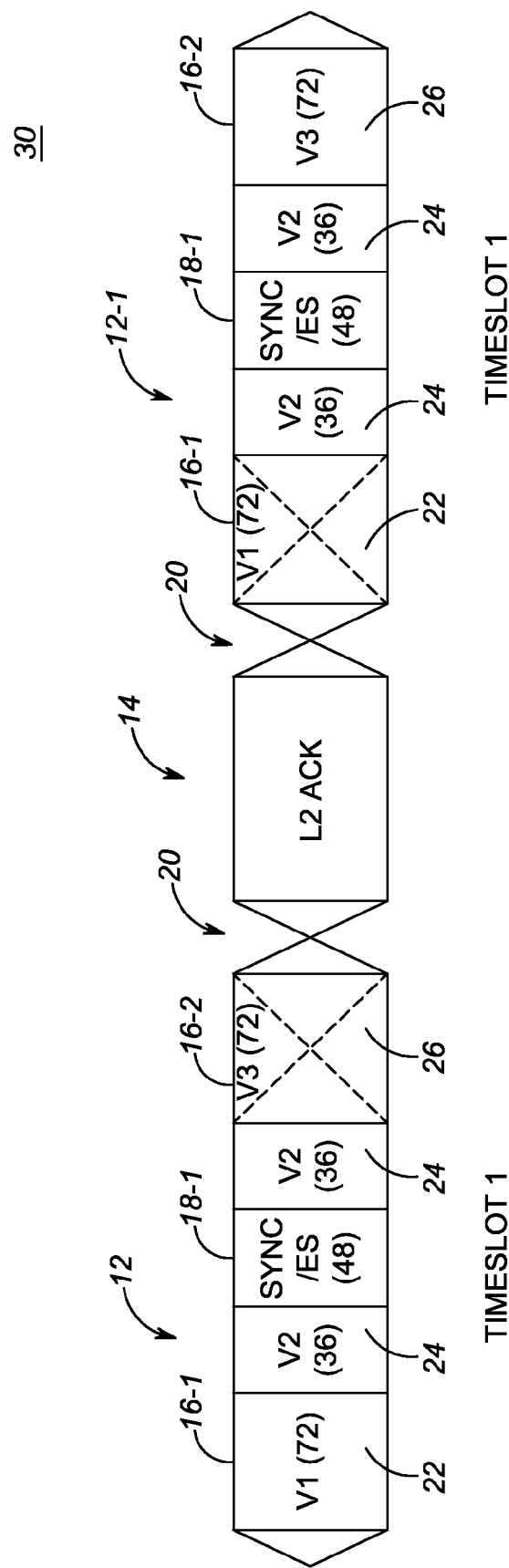
FIG. 3 is a block diagram of a data stream showing an exemplary operation using the two timeslot DMR data stream of FIGS. 1-2 in accordance with some embodiments.

FIG. 3 is a block diagram of a data stream 30 showing an exemplary operation using the two timeslot DMR data stream 10 in accordance with some embodiments. FIG. 3 illustrates first and second timeslots similar to FIG. 2, but adds an additional timeslot 12-1 after the timeslot 14. Here, in this example of FIG. 3, the timeslot 14 includes a transmitted L2 ACK while the timeslot 12 includes received audio (e.g., un-discarded audio portions V1 22, V2 24, and V2 24). Discarded audio portion V3 26 in timeslot 16-2 is discarded and not received. Upon returning to the home slot 12-1, another 20 msec audio segment is also sacrificed, i.e. the voice segment V1 22 in the timeslot 12-1, next to the guard time 20 for further IC programming (not shown). Each voice segment 22, 24, 24 carries 20 msec audio. Therefore the radio misses a total of 40 msec of audio when it transmits an L2 response in the data slot, timeslot 14.

Further, an Advanced Multiband Excitation (AMBE) vocoder may utilize a mitigation mechanism to minimize the impact of the 40 msec audio hole in the received audio. That is, 20-40 msec (1-2 Voice Frames) of mitigated audio is generally not detectable in strong signal conditions. Typically a frame repeat occurs first (e.g., repeating a previously received voice frame at a speaker of the receiving radio), followed by a frame mute (e.g., muting audio output at a speaker of the receiving radio). In the example of FIG. 3, the radio sacrifices (e.g., discards) the voice segment V3 26 in the timeslot 12 and the voice segment V1 22 in the timeslot 12-1 in exchange for increased frequency switching times. Therefore the radio misses 20+20 msec of audio when it transmits an L2 response in the data slot. Losing two voice frames creates enough time to program ICs and switch the operating frequency (twice).

The following table illustrates, without limitation, exemplary scenarios for the two timeslot DMR data stream 10 and operating the wireless method, apparatus, and system therewith.

| Case | Home Slot | Adjacent Slot | |
|---|---|---|---|
| 1 | Receive Voice | Receive Data | Radio monitor both slots, no audio impact |
| 2 | Receive Voice | Transmit L2 ACK | Allow transmit L2 with minor audio hole (FIG. 3) |
| 3 | Receive Voice | Transmit data/ L7 ACK | Queue and transmit after voice ends |
| 4 | Receive Voice | Transmit CSBK | Allow transmit CSBK including GPS CSBK with minor audio hole (FIG. 3) |
| 5 | Transmit Voice | Receive Data | Avoid this scenario by channel access rules |
| 6 | Transmit Voice | Transmit ACK | Since the radio can't receive data when transmitting voice, should be rare chance on this scenario. If race condition does occur, just queue the ACK and transmit after voice. |

In the first case, the timeslot 12 includes receiving voice and the timeslot 14 includes receiving data. Here, there is no audio impact (i.e., the receiving of voice and data is both done on the same frequencies). In the second and fourth cases, there is a minor audio hole as shown in FIG. 2 with the voice segment V3 26 in the timeslot 12 and the voice segment V1 22 in the timeslot 12-1 dropped (discarded) to provide additional time for IC programming to switch between separate transmit and receive frequencies. In the second and fourth cases, a radio is receiving voice in the timeslot 12, 12-1. In the second case, the radio is transmitting a L2 ACK in the second timeslot 14, and in the fourth case, the radio is transmitting a CSBK in the second timeslot 14. In the third case, the radio is receiving voice in the timeslot 12 and needs to transmit data and/or a L7 ACK in the adjacent slot 14, and the radio queues the data and waits until after the voice ends to transmit.

In the fifth case, the radio is transmitting voice in the timeslot 12 and needs to receive data in the timeslot 14. This case is avoided based on channel access rules. Specifically, to avoid the radio from having to receive data while it is transmitting voice, the wireless method, apparatus, and system prevent a data transmitting radio from sending group messages that the voice transmitting radio is attached to, and prevent the data transmitting radio from sending individual messages to the voice transmitting radio. That is, a radio is prevented from sending individual data messages to another radio currently transmitting voice. Further, a radio is prevented from sending data messages to any groups that contain a radio currently transmitting voice.

To prevent the data transmitting radio from sending individual data messages to the voice transmitting radio, the wireless method, apparatus, and system includes the data transmitting radio monitoring a source ID from the link control on the adjacent timeslot 12 (voice slot). If the voice transmitting radio is the target radio of a data message, the data transmitting radio shall wait, i.e. queue the data message, for the voice call to end before transmitting the data, else, it shall proceed with the data transmission. To prevent the data transmitting radio from sending group data messages to the voice transmitting radio that it is attached to, all the radios on an RF channel are programmed with a same sets of talkgroup lists (e.g., receive member lists). When a radio transmits a voice call, it includes the talkgroup list index (identifier) in the LC of at least one of the Voice Headers and selective superframes (embedded) thereafter. The data transmitting radio monitors the talkgroup list index and determines whether the target group is included in the identified talkgroup list. If the target group is included, the data transmitting radio queues the data, else, it proceeds with the data transmission.

Figure 4:
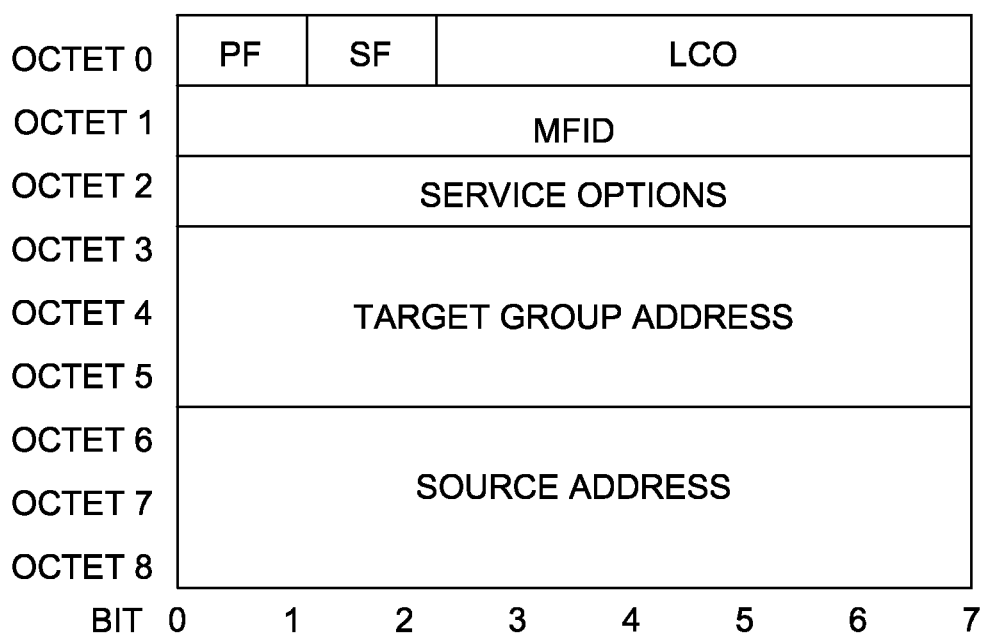
FIG. 4 is a block diagram of an exemplary data packet for the wireless method, apparatus, and system in accordance with some embodiments.

FIG. 4 is a block diagram of an exemplary data packet header 40 for the wireless method, apparatus, and system in accordance with some embodiments. The data packet header 40 can be used in the timeslot 12 as described herein for voice data. The data packet header 40 includes a protected flag (PF), a format flag (SF), a Link Control Opcode (LCO), a manufacturer's identification word (MFID), service options, a target group address, and a source address. In the context of the wireless method, apparatus, and system, a bit in the service options is used to indicate a talkgroup list index is embedded in the data packet header 40. For example, the service options can include Emergency (1), Privacy (1), TI (2), Broadcast (1), Phone (1), Talkgroup list index (1). The talkgroup list index can be placed in the source address position to reduce the impact to scanning With the data packet header 40, each radio can be synchronized with respect to talkgroup memberships by analysing and storing the talkgroup list index when the data packet header 40 indicates it is present.

A target talkgroup address has 24 bits. In another exemplary embodiment, the most significant 8-bit may be used to indicate the talk group list index and the least significant 16 bits to define the different talkgroups belonging to one talkgroup list index. Other variations exist by using a few bits of the 24 bit talkgroup address to differentiate different talkgroup list index while the rest of the 24 bit talkgroup address are used to define different talkgroups belonging to a same talkgroup list index. For this method, the target group address field in FIG. 4 is used to indicate the talkgroup list index and not the source address field. This method is simpler and only needs to partition the 24-bit address space of the talk group address to indicate a talkgroup list index as described in this paragraph.

Figure 5:
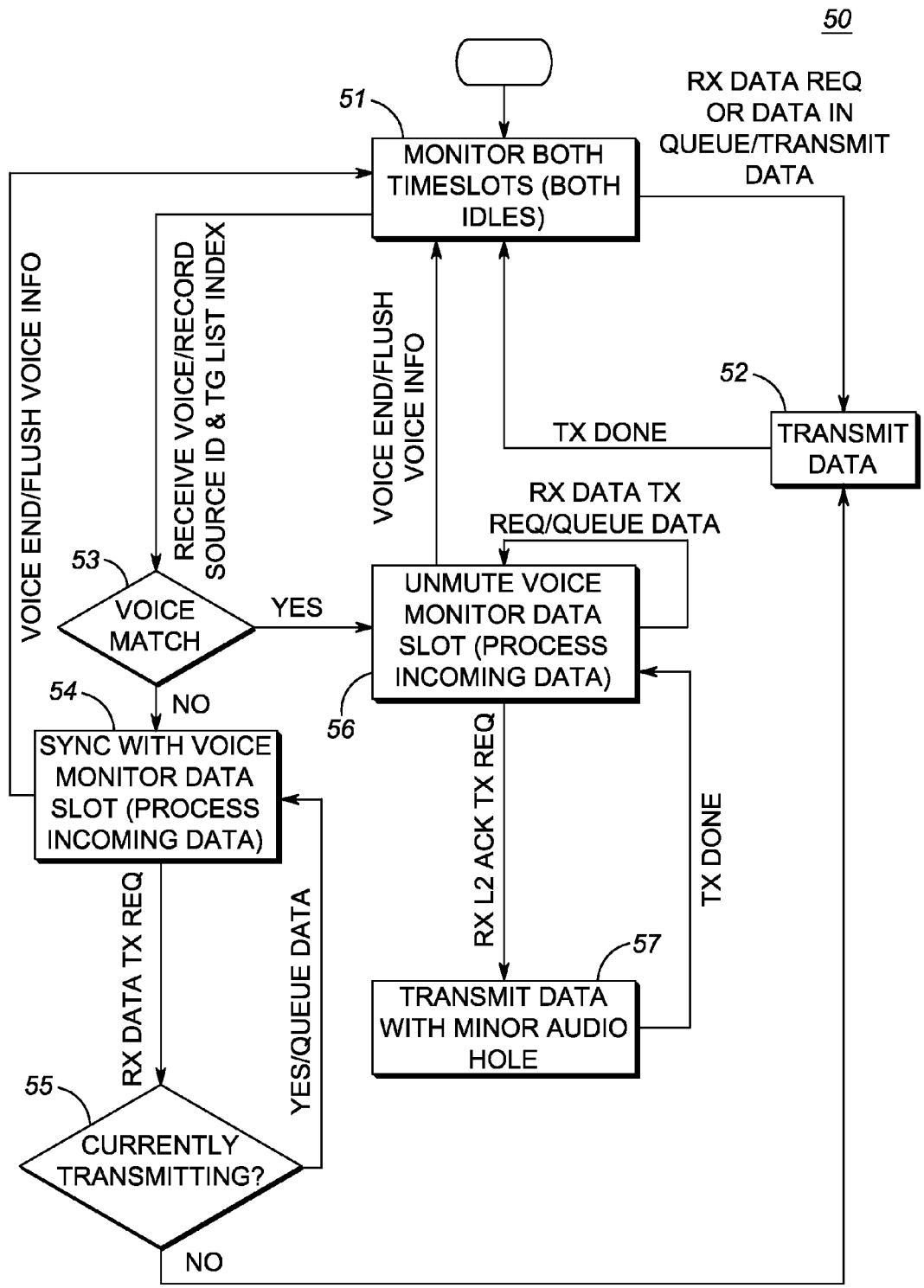
FIG. 5 is a state diagram of a method of simultaneously transacting voice and data on adjacent timeslots in accordance with some embodiments.

FIG. 5 is a state diagram of a method 50 of simultaneously transacting voice and data on adjacent timeslots in accordance with some embodiments. The method 50 can be implemented in a radio, such as described in FIG. 6. The method 50 allows simultaneous voice and data receive/transmit through channel access rules. When a radio is transmitting voice and a talkgroup list index in a first timeslot, another radio cannot transmit data message with the relevant destination group ID indicated by the talkgroup list index in the second slot. When a radio is transmitting voice and its own unit ID in a first timeslot, another radio cannot transmit data message with this destination unit ID in the second slot. When a radio is receiving voice on one slot and data on the other slot, the data slot is allowed to transmit short first data like link layer acknowledgement, a control signaling block, or a control signaling block acknowledgement layer 2 ACK. This includes CSBK GPS which is one burst only. When a radio is not transmitting voice on one slot, another radio is always allowed to transmit data on the other slot.

The method 50 includes monitoring both timeslots (step 51). Initially, it is assumed both the timeslots are IDLE. During the monitoring (step 51), if the radio receives a data request or has data in queue or needs to transmit data, the radio transmits data on the timeslots (step 52), and after completed returns to step 51. During the monitoring (step 51), if the radio receives voice, the radio records the source ID and talkgroup (TG) list index and checks for a voice match (step 53). If there is no voice match (step 53), the method 50 synchronizes with the voice and monitors the data timeslot to process incoming data (step 54). If the radio receives a request to transmit first and second data, and the destination radio is currently transmitting (step 55), the radio queues the data and returns to step 54. If the destination radio is not currently transmitting (step 55), the radio transmits the data (step 52). When the voice ends, the method 50 flushes the voice info and returns to step 51.

If there is a voice match (step 53), the method 50 unmutes voice and monitors the data timeslot to process incoming data (step 56). If the radio receives a request to transmit second data in step 56, the radio queues the data and returns to step 56. If the radio receives a first data transmission request like a L2 ACK transmission request, the radio transmits the data with a minor audio hole by dropping/discarding voice frames (step 57) and returns to step 56 when done. When the voice ends, the method 50 flushes the voice info and returns to step 51.

Figure 6:
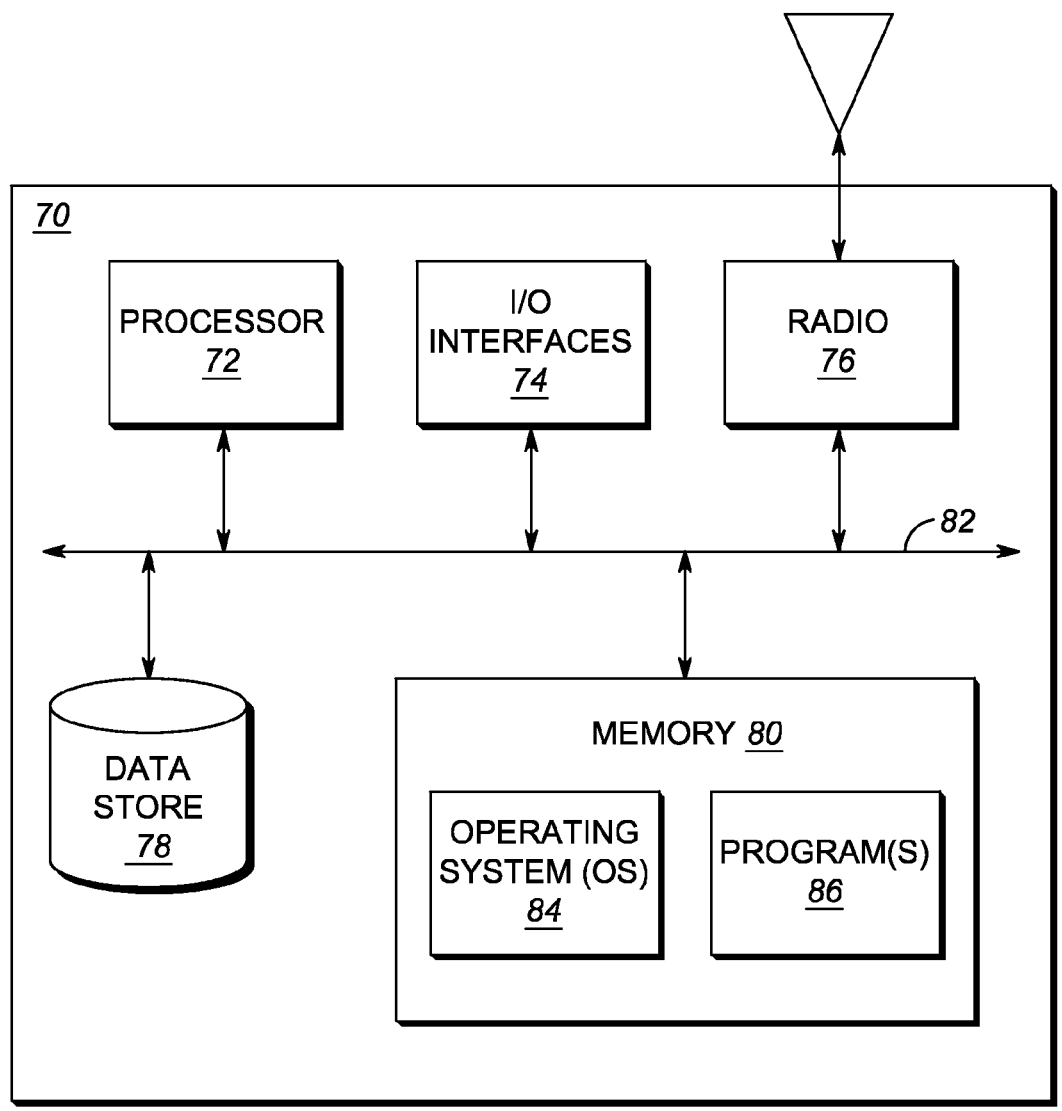
FIG. 6 is a block diagram of an exemplary implementation of a mobile device in accordance with some embodiments.

FIG. 6 is a block diagram of an exemplary implementation of a mobile device 70 in accordance with some embodiments. In the various exemplary embodiments described herein, the mobile device 70 can be a radio implementing the disclosed wireless method, apparatus, and system, including one or more of the steps set forth in FIGS. 5 and 7 and using one or more of the slot structures set forth in FIGS. 2 and 3. The mobile device 70 can be a digital device that, in terms of hardware architecture, generally includes a processor 72, input/output (I/O) interfaces 74, a radio 76, a data store 78, and memory 80. It should be appreciated by those of ordinary skill in the art that FIG. 6 depicts the mobile device 70 in an oversimplified manner, and a practical embodiment can include additional components and suitably configured processing logic to support known or conventional operating features that are not described in detail herein. The components (72, 74, 76, 78, and 80) are communicatively coupled via a local interface 82. The local interface 82 can be, for example but not limited to, one or more buses or other wired or wireless connections, as is known in the art. The local interface 82 can have additional elements, which are omitted for simplicity, such as controllers, buffers (caches), drivers, repeaters, and receivers, among many others, to enable communications. Further, the local interface 82 may include address, control, and/or data connections to enable appropriate communications among the aforementioned components.

The processor 72 is a hardware device for executing software instructions. The processor 72 can be any custom made or commercially available processor, a central processing unit (CPU), an auxiliary processor among several processors associated with the mobile device 70, a semiconductor-based microprocessor (in the form of a microchip or chip set), or generally any device for executing software instructions. When the mobile device 70 is in operation, the processor 72 is configured to execute software stored within the memory 80, to communicate data to and from the memory 80, and to generally control operations of the mobile device 70 pursuant to the software instructions. In an exemplary embodiment, the processor 72 may include a mobile optimized processor such as optimized for power consumption and mobile applications. The I/O interfaces 74 can be used to receive user input from and/or for providing system output. User input can be provided via, for example, a keypad, a touch screen, a scroll ball, buttons, bar code scanner, and the like. System output can be provided via a display device such as a liquid crystal display (LCD), touch screen, and the like. The I/O interfaces 74 can also include, for example, a serial port, a parallel port, a small computer system interface (SCSI), an infrared (IR) interface, a radio frequency (RF) interface, a universal serial bus (USB) interface, and the like. The I/O interfaces 74 can include a graphical user interface (GUI) that enables a user to interact with the mobile device 70.

The radio 76 enables wireless communication to an external access device or network. Any number of suitable wireless data communication protocols, techniques, or methodologies can be supported by the radio 76, including, without limitation: RF; Land Mobile Radio (LMR); DMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; LTE; cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; P25; proprietary wireless data communication protocols such as variants of Wireless USB; and any other protocols for wireless communication. The data store 78 can be used to store data. The data store 78 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 78 can incorporate electronic, magnetic, optical, and/or other types of storage media.

The memory 80 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 80 may incorporate electronic, magnetic, optical, and/or other types of storage media. Note that the memory 80 can have a distributed architecture, where various components are situated remotely from one another, but can be accessed by the processor 72. The software in memory 80 can include one or more software programs, each of which includes an ordered listing of executable instructions for implementing logical functions. In the example of FIG. 6, the software in the memory 80 includes a suitable operating system (O/S) 84 and programs 86. The operating system 84 essentially controls the execution of other computer programs, and provides scheduling, input-output control, file and data management, memory management, and communication control and related services. The programs 86 can include various applications, add-ons, etc. configured to provide end user functionality with the mobile device 70 such as implementing the wireless method, apparatus, and system. The programs 86 may include, for example, instructions that, when executed by the processor 72, perform one or more of the steps set forth in FIGS. 5 and 7 and using one or more of the slot structures set forth in FIGS. 2 and 3.

In an exemplary embodiment, the mobile device 70 can be part of a system which includes a plurality of radios wirelessly coupled therebetween via two adjacent timeslots; wherein the plurality of radios utilize a first timeslot of the two adjacent timeslots for voice communication therebetween; wherein the plurality of radios utilize a second timeslot of the two adjacent timeslots for data communications; and wherein the plurality of radios utilize a set of channel access rules to enable voice on the first timeslot and data on the second timeslot, the set of channel access rules provide discarding of a portion of audio in the first timeslot to enable a larger guard time for programming the radio between the first timeslot and the second timeslot and queuing of data for the second timeslot as appropriate.

Figure 7:
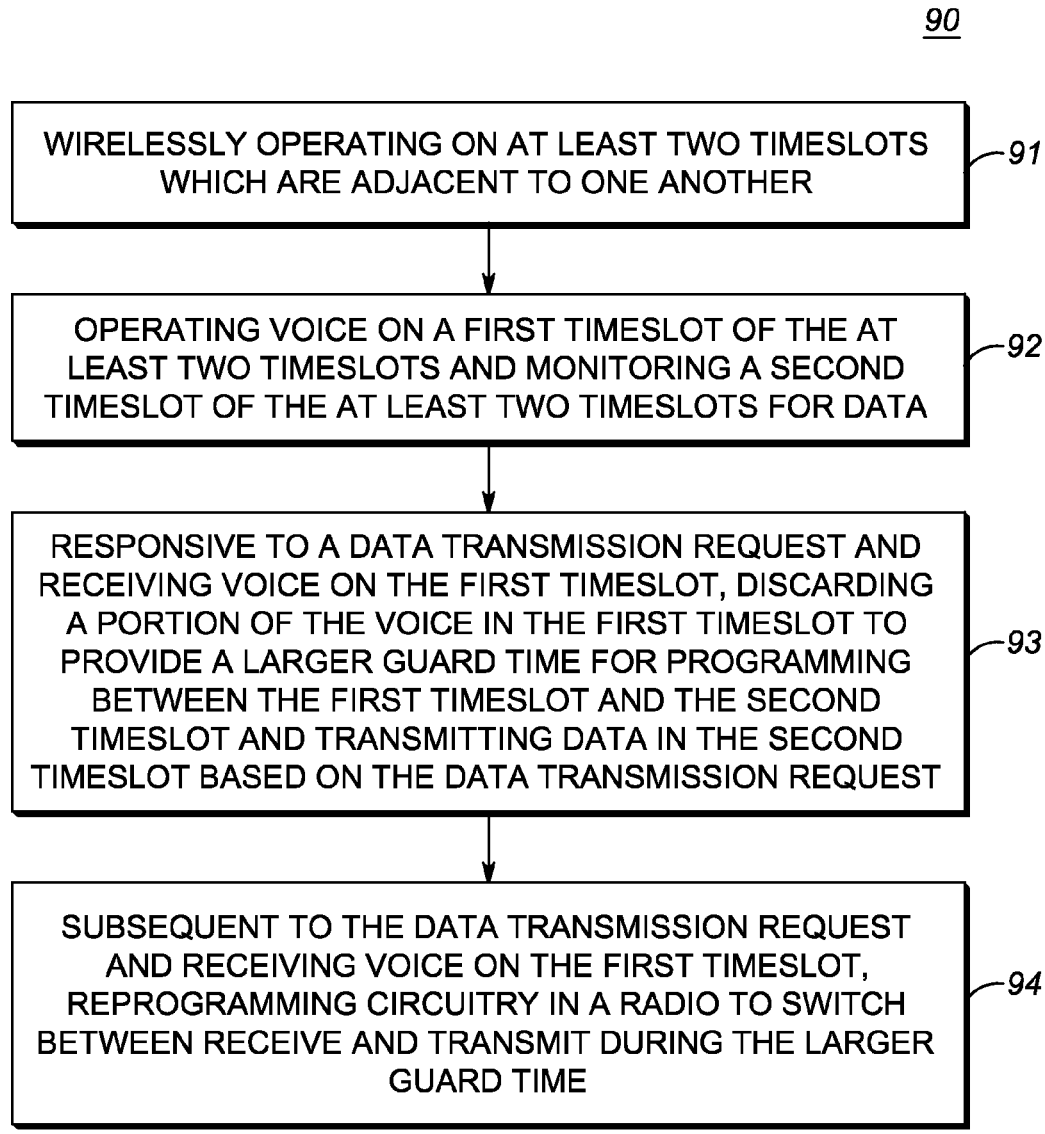
FIG. 7 is a flowchart of a wireless method in accordance with some embodiments.

FIG. 7 is a flowchart of a wireless method 90 in accordance with some embodiments. The wireless method 90 includes wirelessly operating on at least two timeslots which are adjacent to one another (step 91). The wireless method 90 includes operating voice on a first timeslot of the at least two timeslots and monitoring a second timeslot of the at least two timeslots for data (step 92). The wireless method 90 also includes, responsive to a data transmission request and receiving (un-discarded) voice on the first timeslot, discarding (e.g., sacrificing) a portion of the voice in the first timeslot to provide a larger guard time for programming between the first timeslot and the second timeslot and transmitting data in the second timeslot based on the data transmission request (step 93).

Optionally, the wireless method 90 includes, subsequent to the data transmission request and receiving voice on the first timeslot, reprogramming circuitry in a radio to switch between a receive and a transmit mode during the larger guard time (step 94). The wireless method 90 can also include transmitting data in the second timeslot comprising one of a link layer acknowledgement, a control signaling block, or a control signaling block acknowledgement. Optionally, the wireless method 90 operates on a two timeslot time division multiple access system and the two timeslot time division multiple access system comprises DMR.

The wireless method 90 can include transmitting voice on the first timeslot at a first radio; and preventing, at a second radio, transmission of data to the first radio until the first radio has completed the transmitting voice on the first timeslot. The wireless method 90 can include monitoring a target talkgroup associated with the voice on the first timeslot at the second radio; and determining the preventing based on detecting the first radio is included in a talkgroup list based on the monitoring.

The wireless method 90 can include implementing a set of channel access rules for the first timeslot and the second timeslot, the channel access rules based on whether the first timeslot is receiving or transmitting voice and whether the second timeslot is receiving or transmitting data. The set of channel access rules comprise: if receiving voice on the first timeslot and receiving data on the second timeslot, monitoring both slots for data associated therewith without audio impact; if receiving voice on the first timeslot and transmitting first data on the second timeslot, discarding a portion of the voice to enable the larger guard time, wherein the first data comprises one of a link layer acknowledgement, a control signaling block, or a control signaling block acknowledgement; if receiving voice on the first timeslot and transmitting second data on the second timeslot, queuing the second data until after the voice ends, wherein the second data comprises any data except the first data; and if transmitting voice on the first timeslot and receiving data on the second timeslot, avoiding the receiving data via providing a radio transmitting the receiving data with a source identifier or talkgroup list identifier of a radio performing the transmitting voice.

The wireless method 90 can include discarding a last voice frame of the first timeslot to provide the larger guard time for programming between the first timeslot and the second timeslot and transmitting data in the second timeslot based on the data transmission request; and discarding a first voice frame of a next first timeslot to provide the larger guard time for programming between the first timeslot and the second timeslot and receiving un-discarded audio in the next first timeslot subsequent to the discarding the first voice frame in the next first timeslot. The last voice frame and the first voice frame comprise 40 msec of total audio discarded.

In the various exemplary embodiments described herein, the systems and methods have described transmitting/receiving voice on the first slot and transmitting/receiving data on the second slot. Those of ordinary skill in the art will recognize that the first slot may transmit/receive data as well with the second slot continuing to transmit data. In this exemplary embodiment, the channel access rules can be enhanced to include, if the radio is receiving data not meant for it on the first slot, the radio may transmit single CSBK GPS data, for example, on the second slot to another radio. If the radio is receiving data meant for it on the first slot, the radio can queue the CSBK GPS data, for example, and transmit when the radio is not receiving data meant for it. Similarly, a second radio transmitting data on the second slot makes use of source identifier or talkgroup list index from a radio transmitting data on first slot to decide if it should transmit data to the destination radio on the first slot.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless method for operating on at least two timeslots that are adjacent to one another, the method comprising:
   wirelessly receiving, at a wireless radio, voice on a first timeslot of the at least two adjacent timeslots and monitoring a second timeslot of the at least two adjacent timeslots for data; and
   responsive to detecting, by the wireless radio, a data transmission request requesting the wireless radio transmit data:
      wirelessly receiving, by the wireless radio, un-discarded wirelessly transmitted voice on the first timeslot;
      discarding, by the wireless radio, a portion of the wirelessly transmitted voice in the first timeslot to provide a larger guard time for reprogramming between the first timeslot and the second timeslot;
      reprogramming, by the wireless radio, wireless radio circuitry to switch between receive and transmit modes during the larger guard time; and
      after the reprogramming, wirelessly transmitting, by the wireless radio, data in the second timeslot based on the data transmission request.

2. The wireless method of claim 1, further comprising:
   wherein the reprogramming the wireless radio circuitry is performed subsequent to the data transmission request and subsequent to receiving the voice on the first timeslot.

3. The wireless method of claim 1,
   wherein the wirelessly transmitting data in the second timeslot comprises wirelessly transmitting one of a link layer acknowledgement, a control signaling block, and a control signaling block acknowledgement.

4. The wireless method of claim 1, wherein the wireless method operates on a two timeslot time division multiple access (TDMA) system.

5. The wireless method of claim 4, wherein the two timeslot TDMA system comprises Digital Mobile Radio (DMR).

6. The wireless method of claim 1, further comprising:
   transmitting voice on the first timeslot at a first radio; and
   preventing, at a second radio, transmission of data to the first radio until the first radio has completed the transmitting voice on the first timeslot.

7. The wireless method of claim 6, further comprising:
   monitoring a target talkgroup associated with the voice on the first timeslot at the second radio; and
   wherein the step of preventing transmission of data to the first radio is responsive to detecting that the first radio is included in a talkgroup list based on the monitoring.

8. The wireless method of claim 1, further comprising:
   implementing, by the wireless radio, a set of channel access rules for the first timeslot and the second timeslot, the channel access rules based on whether the first timeslot is receiving or transmitting voice and whether the second timeslot is receiving or transmitting data.

9. The wireless method of claim 8, wherein the set of channel access rules comprise:
   if receiving voice on the first timeslot and receiving data on the second timeslot, monitoring both slots for data associated therewith without audio impact;
   if receiving voice on the first timeslot and transmitting first data on the second timeslot, discarding a portion of the voice to enable the larger guard time, wherein the first data comprises one of a link layer acknowledgement, a control signaling block, or a control signaling block acknowledgement;
   if receiving voice on the first timeslot and transmitting second data on the second timeslot, queuing the second data until after the voice ends, wherein the second data comprises any data except the first data; and
   if transmitting voice on the first timeslot and receiving data on the second timeslot, avoiding the receiving data via providing a radio transmitting the receiving data with a source identifier or talk group list identifier of a radio performing the transmitting voice.

10. The wireless method of claim 1, further comprising:
    discarding, by the wireless radio, a last voice frame of the first timeslot to provide the larger guard time for reprogramming between the first timeslot and the second timeslot;
    discarding, by the wireless radio, a first voice frame of a next first timeslot adjacent the second timeslot to provide a second larger guard time for second reprogramming between the next first timeslot and the second timeslot; and
    after the second reprogramming, receiving, by the wireless radio, un-discarded wirelessly transmitted voice in the next first timeslot.

11. The wireless method of claim 10, wherein the last voice frame and the first voice frame each comprise 20 msec of audio.

12. An apparatus, comprising:
    radio circuitry configured to wirelessly transmit and receive on at least two adjacent timeslots;
    a processor communicatively coupled to the radio circuitry; and
    memory storing instructions that, when executed by the processor, cause the processor to perform steps of:
    wirelessly receive, via the radio circuitry, voice on a first timeslot of the at least two adjacent timeslots and monitor, via the radio circuitry, a second timeslot of the at least two adjacent timeslots for data; and
    responsive to detecting a data transmission request requesting transmission of data via the radio circuitry:
       receive, via the radio circuitry, un-discarded wirelessly transmitted voice on the first timeslot;
       discard a portion of the wirelessly transmitted voice in the first timeslot to provide a larger guard time for reprogramming the radio circuitry between the first timeslot and the second timeslot;
       reprogram the radio circuitry to switch between receive and transmit modes during the larger guard time; and subsequently wirelessly transmit, via the radio circuitry, data in the second timeslot based on the data transmission request.

13. The apparatus of claim 12, wherein the data wirelessly transmitted in the second timeslot comprises one of a link layer acknowledgement, a control signaling block, and a control signaling block acknowledgement.

14. The apparatus of claim 12, wherein the wireless method operates on a two timeslot time division multiple access (TDMA) system comprising Digital Mobile Radio (DMR).

15. The apparatus of claim 12, wherein the instructions, when executed, further cause the processor to perform steps of:
receive, via the radio circuitry, un-discarded voice on the first timeslot at a first radio; and
prevent transmission, via the radio circuitry, of data to another radio that is currently transmitting voice on the first timeslot until the another radio has completed the transmitting voice on the first timeslot.

16. The apparatus of claim 15, wherein the instructions, when executed, further cause the processor to perform steps of:
monitor a target talkgroup associated with the voice on the first timeslot; and
wherein the step of preventing transmission of data to the first radio is responsive to detecting that the first radio is included in a talkgroup list based on the monitoring.

17. The apparatus of claim 12, wherein the instructions, when executed, further cause the processor to perform steps of:
implement a set of channel access rules for the first timeslot and the second timeslot, the channel access rules based on whether the first timeslot is receiving or transmitting voice and whether the second timeslot is receiving or transmitting data.

18. The apparatus of claim 17, wherein the set of channel access rules comprise:
if receiving voice on the first timeslot and receiving data on the second timeslot, monitoring both slots for data associated therewith without audio impact;
if receiving voice on the first timeslot and transmitting first data on the second timeslot, discarding a portion of the voice to enable the larger guard time, wherein the first data comprises one of a link layer acknowledgement, a control signaling block, or a control signaling block acknowledgement;
if receiving voice on the first timeslot and transmitting second data on the second timeslot, queuing the second data until after the voice ends, wherein the second data comprises any data except the first data; and
if transmitting voice on the first timeslot and receiving data on the second timeslot, avoiding the receiving data via providing a radio transmitting the receiving data with a source identifier or talkgroup list identifier of a radio performing the transmitting voice.

19. The apparatus of claim 12, wherein the instructions, when executed, further cause the processor to perform steps of:
discard a last voice frame of the first timeslot to provide the larger guard time for reprogramming between the first timeslot and the second timeslot;
discard a first voice frame of a next first timeslot adjacent the second timeslot to provide a second larger guard time for second reprogramming between the second timeslot and the next first timeslot; and
after the second reprogramming, receiving un-discarded wirelessly transmitted voice in the next first timeslot.

20. The wireless method of claim 1, further comprising the wireless radio playing back, via a speaker, the un-discarded wireless transmitted voice.

* * * * *